United States Patent [19]
Misra

[11] Patent Number: 5,258,168
[45] Date of Patent: Nov. 2, 1993

[54] PRODUCTION OF ALUNITES

[75] Inventor: Chanakya Misra, Plum Boro, Pa.

[73] Assignee: Aluminum Company of America, Pittsburgh, Pa.

[21] Appl. No.: 381,818

[22] Filed: Jul. 19, 1989

[51] Int. Cl.$^5$ .......................... C01F 1/00; C01F 7/02; C01C 1/24; C01D 5/00

[52] U.S. Cl. .................................. 423/117; 423/127; 423/551; 423/548; 423/556; 423/600; 423/545

[58] Field of Search ............... 423/120, 127, 551, 556, 423/600, 626, 545, 117, 548, 549; 502/218

[56] References Cited

U.S. PATENT DOCUMENTS

| | | | |
|---|---|---|---|
| 3,226,186 | 12/1965 | Bretsznajder et al. | 423/556 |
| 3,226,187 | 12/1965 | Bretsznajder et al. | 423/556 |
| 3,436,176 | 1/1969 | Spedden et al. | 423/127 |
| 3,954,957 | 5/1976 | Koenig | 423/626 |

OTHER PUBLICATIONS

"Conditions of Alunite Synthesis", Kashkai, Probl. Metasomatizma, pp. 361-368, Ref. Zh., Geol. V. 1971, Abstr. #3v619, 53 Mineralogical and Geological Chemistry, 1970.

*Primary Examiner*—Michael Lewis
*Assistant Examiner*—Steven Bos
*Attorney, Agent, or Firm*—Andrew Alexander; David W. Pearce-Smith

[57] ABSTRACT

Disclosed is a method for preparing high purity alunite. In the method, a material selected from the group consisting of sodium sulfate, sodium bisulfate, ammonium sulfate, ammonium bisulfate, potassium sulfate and potassium bisulfate is provided and reacted with a source of aluminum hydroxide in a liquid. The reaction is carried out under acidic conditions, and alunite is recovered after separating, washing and drying.

3 Claims, 2 Drawing Sheets

PRODUCTION OF ALUNITES

BACKGROUND OF THE INVENTION

This invention relates to alunite-type compounds and more particularly it relates to a process for making alunite and a high purity product, e.g., natroalunite resulting therefrom.

The occurrence and geology of the mineral alunite in many parts of the world is widely recognized and well documented. However, such natural deposits contain many impurities such as quartz, kaolin, iron oxides and other minerals which are difficult and expensive to remove. Further, natroalunite, which has sodium in the place of potassium in the chemical formula, is often mixed with alunite and is not found in the pure form in deposits. Ammonium alunite has ammonium in place of potassium. There are no reports of its occurrence in nature.

U.S. Pat. No. 3,436,176 discloses a process for producing high purity alumina from aluminum-bearing acidic, sulfate solutions. According to the patent, the feed solution may be considered as taken from a cyclic backing system of the waste dump of a copper mine, and a sodium or ammonium salt is added to such feed solution. With the salt added, 85% of the aluminum values present in the solution precipitates as sodium or ammonium alunite which contains 35 to 45% aluminum oxide, less than 3% iron, and less than 5% sodium or ammonium ions. Thereafter, the sodium or ammonium alunite is calcined and digested to produce alumina.

However, there is still a great need for a process to produce a high purity alunite, e.g., natroalunite. The present invention provides such a process and produces a high purity alunite.

SUMMARY OF THE INVENTION

Disclosed is a method for preparing high purity alunite. In the method, a material selected from the group consisting of sodium sulfate, sodium bisulfate, ammonium sulfate, ammonium bisulfate, potassium sulfate and potassium bisulfate is provided and reacted with a source of aluminum hydroxide in a liquid. The reaction is carried out under acidic conditions, and alunite is recovered after separating and drying.

An object of the invention is to provide a method for producing high purity alunite.

Another object of the invention is to provide a method for producing high purity natroalunite.

Yet another object of the invention is to provide a method for producing high purity ammonium alunite.

Yet another object of the invention is to provide a method for producing high purity potassium alunite.

Still a further object of the invention is to produce high purity natroalunite.

Still a further object of the invention is to produce high purity ammonium alunite.

Still a further object of the invention is to produce high purity potassium alunite.

These and other objects will become apparent from the drawings, specification and claims appended hereto.

DETAILED DESCRIPTION OF THE PREFERRED EMBODIMENTS

Figure 1:
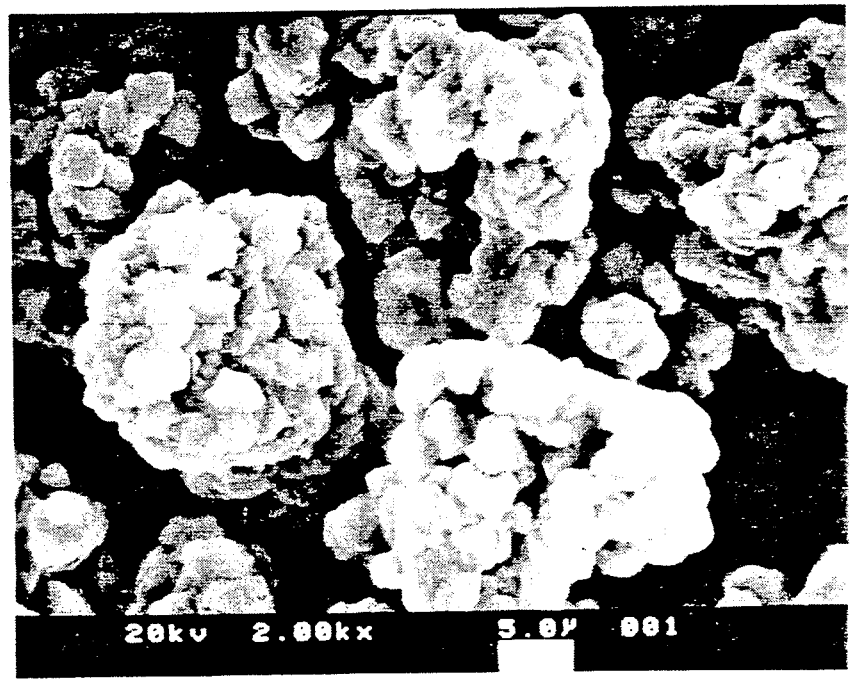
FIG. 1 is an SEM picture of the sodium alunite (natroalunite) product.

The present invention provides a process for producing high purity natroalunite, for example. The alunite is produced in accordance with the following reaction:

$$2MHSO_4 + 3Al(OH)_3 \rightarrow MAl_3(SO_4)_2(OH)_6 + 2H_2O + MOH$$

where M is selected from sodium, potassium and ammonium. Thus, the sulfate can be selected from sodium sulfate or sodium bisulfate, ammonium sulfate or ammonium bisulfate, and potassium sulfate or potassium bisulfate. Preferably, the weight ratio sulfate to hydroxide is slightly in excess of the stoichiometric amount required for the reaction. That is, preferably, the alkaline sulfate is in excess of the stoichiometric amount by 10 to 100 weight percent. The aluminum hydroxide preferred is solid crystalline aluminum hydroxide, e.g., aluminum trihydroxide such as gibbsite available from the Bayer process, 95 wt., preferably 99 wt.% purity. Preferably, the aluminum hydroxide has a particle size in the range of 1 to 200 $\mu$m with a typical size being in the range of 10 to 100 $\mu$m.

For purposes of effecting the reaction, the sulfate or bisulfate is provided in an aqueous solution. Preferably, the concentration of sulfate or bisulfate in the solution is in the range of 0.2 to 6 molar, typically in the range of 0.5 to 4 molar with a suitable concentration being 1 to 2 molar.

Further, for effecting the reaction, the pH of the aqueous solution is maintained in the range of 1 to 6, preferably 1.5 to 5 and typically 2 to 4. The pH can be adjusted by adding sulfuric acid, for example.

In addition, the reaction can be carried out at a temperature of at least 80° C, preferably more than 100° C. Normally, a temperature of over 250° C. is not required, but a higher temperature may be used. Preferably, the reaction is carried out at a temperature in the range of 120° to 200° C.

The reactants are kept in this temperature range for a sufficient time for the reaction to occur. Normally, this time is in the range of about 20 minutes to about 10 hours with longer times not being detrimental. Typical reaction times are in the range of $\frac{1}{2}$ to 8 hours.

The reaction may be carried out under autogeneous pressure in a closed or fluid-tight vessel. The product produced in accordance with the invention has a purity of at least 90 wt.%, and typically the purity is greater than 95%. Iron oxide and silica are less than 0.5 wt.% and typically less than 0.2 wt.% with preferred levels being less than 0.1 wt.%. The highest level of material incorporated in the alunite is aluminum hydroxide which can be as high as 10 wt.% but is generally less than 5 wt.% and typically less than 1 wt.%. Thus, it will be seen that a unique product results from the combination of alunite and aluminum hydroxide dispersed therethrough, and such is contemplated within the purview of the invention. Thus, the product can contain greater than 90 wt.% alunite, the remainder aluminum hydroxide, incidental elements and impurities. The aluminum hydroxide used in the reaction is the source of most impurities, and thus, the higher level of impurity in the aluminum hydroxide, the higher level of impurities in the product.

When natroalunite is produced, the product is white, free flowing and crystalline after separation, washing and drying. If it is desired to improve the level of whiteness, then a bleaching agent can be used. The bleaching agent can be added with the reactants and can range from 0.1 to 2.5 wt.%, typically 0.7 to 17 wt.%, based on the weight of aluminum hydroxide used. Such agents can include sodium hypochlorite, sodium persulfate and hydrogen peroxide.

After the reaction, the product can be separated from the aqueous solution by filtration or centrifugation. Thereafter, it can be washed in deionized water and then dried to produce the free-flowing powder.

When sodium or natroalunite was produced in accordance with the invention, chemical analysis showed this material corresponded to the formula $NaAl_3(SO_4)_2(OH)_6$. Also, X-ray diffraction identification showed that this material was pure natroalunite, i.e., identical to the diffraction pattern on card number 14-130, published by The Joint Committee on Powder Diffraction (JCPDS), International Center for Diffraction Data, Swarthmore, PA 19081.

The particle size of the alunite product is generally about the size of the Al(OH) material used in the reaction. FIG. 1 is an SEM picture of the sodium alunite product.

The natroalunite and potassium alunite product is thermally stable to 500° C. The product is useful as a filler in plastic and rubber products and is suitable for use in the production of artificial or cultured marble.

EXAMPLE 1

Natroalunite was prepared as follows: An 18 liter total volume stainless steel autoclave was filled with 12 liters of deionized water. 1350 grams of sodium bisulphate were added to the water and dissolved by operating the stirrer. 750 grams of crystalline aluminum hydroxide were added and the autoclave closed. The autoclave was then heated to 175° C. while maintaining vigorous agitation and held at that temperature for a period of 4 hours. The autoclave was then cooled to room temperature and emptied. The solid product was filtered, washed with hot deionized water and dried overnight at 110° C. Chemical and X-ray diffraction analysis of the product showed it to be pure natroalunite.

EXAMPLE 2

Figure 2:
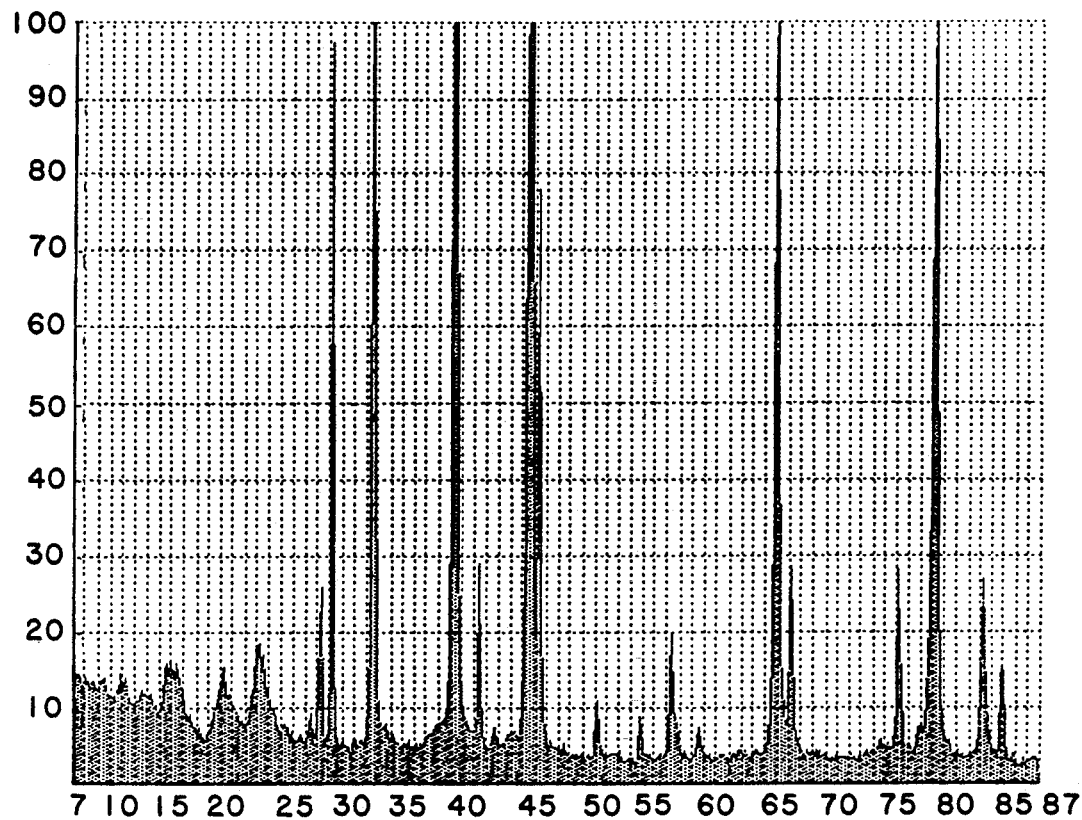
FIG. 2 is an X-ray diffraction pattern of ammonium alunite.

Ammonium alunite was prepared as follows: 1350 grams of ammonium bisulphate were dissolved in 12 liters of deionized water in the same autoclave system used in Example 1. 900 grams of crystalline aluminum hydroxide were added and the autoclave was closed and heated to 175° C. with vigorous agitation. The autoclave was held at this temperature for 4 hours and then cooled to room temperature. The product from the autoclave was filtered, washed and dried as before. Chemical analysis of the product corresponded closely to the formula $NH_4Al_3(SO_4)_2(OH)_6$. The X-ray diffraction pattern of the product is shown in FIG. 2. The pattern was interpreted as belonging to the alunite family though it differs from that of natroalunite.

EXAMPLE 3

This example was performed to improve the whiteness of natroalunite by addition of a bleaching agent. Experiments described in Example 1 were repeated using Bayer Process alumina hydrate having a whiteness index of 57 as the aluminum hydroxide source. The whiteness measurement was carried out using a colorimeter (Pacific Scientific Colorgard System 105) instrument. The first batch was obtained without using any bleaching agent. The whiteness index of the resulting natroalunite product was measured to be 83. In the preparation of the second batch, 100 ml of 30% hydrogen peroxide solution were added to the reaction mixture in the autoclave before closing the autoclave. The resulting product had an improved whiteness index of 94 measured in the same instrument.

While the invention has been described in terms of preferred embodiments, the claims appended hereto are intended to encompass other embodiments which fall within the spirit of the invention.

What is claimed is:

1. A method of preparing sodium alunite comprising the steps of:
   (a) providing a material selected from sodium sulfate and sodium bisulfate in an aqueous solution with particles of aluminum hydroxide, the stoichiometric amount of sulfate being present in an amount 10 to 100% more than said aluminum hydroxide;
   (b) reacting said material with said aluminum hydroxide in a pH range of 1.5 to 5 and in the range of 120° C. to 200° C. to produce sodium alunite; and
   (c) recovering said sodium alunite.

2. A method of preparing potassium alunite comprising the steps of:
   (a) providing a material selected from potassium sulfate and stoichiometric amount of potassium bisulfate in an aqueous solution with particles of aluminum hydroxide, the sulfate being present in an amount 10 to 100% more than said aluminum hydroxide;
   (b) reacting said material with said aluminum hydroxide in a pH range of 1.5 to 5 and in the range of 120° to 200° C. to produce potassium alunite; and
   (c) recovering said potassium alunite.

3. A method of preparing ammonium alunite comprising the steps of:
   (a) providing a material selected from ammonium sulfate and ammonium bisulfate in an aqueous solution with particles of aluminum hydroxide, the stoichiometric amount of sulfate being present in an amount 10 to 100% more than said aluminum hydroxide;
   (b) reacting said material with said aluminum hydroxide in a pH range of 1.5 to 5 and in the range of 120° C. to 200° C. to produce ammonium alunite; and
   (c) recovering said ammonium alunite.

* * * * *